(12) United States Patent
Birkkjaer et al.

(10) Patent No.: US 11,125,214 B2
(45) Date of Patent: Sep. 21, 2021

(54) METHOD FOR ANCHORING A HOLDING MEANS IN A WIND TURBINE AND ADAPTER

(71) Applicant: SIEMENS GAMESA RENEWABLE ENERGY A/S, Brande (DK)

(72) Inventors: Jan Birkkjaer, Jelling (DK); Lasse Jensen, Varde (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 94 days.

(21) Appl. No.: 16/205,410

(22) Filed: Nov. 30, 2018

(65) Prior Publication Data

US 2019/0186464 A1 Jun. 20, 2019

(30) Foreign Application Priority Data

Dec. 18, 2017 (EP) ..................................... 17207938

(51) Int. Cl.
*F03D 13/20* (2016.01)
*F03D 80/50* (2016.01)
(Continued)

(52) U.S. Cl.
CPC .............. *F03D 13/20* (2016.05); *B66C 1/122* (2013.01); *F03D 13/40* (2016.05); *F03D 80/50* (2016.05);
(Continued)

(58) Field of Classification Search
CPC . B66C 1/108; B66C 1/12; B66C 1/122; F05B 2230/61; F05B 2240/916;
(Continued)

(56) References Cited

U.S. PATENT DOCUMENTS 5,752,795 A * 5/1998 D'Adamo ............... F16B 37/14
411/373
2007/0022703 A1* 2/2007 Wolf ..................... E04B 1/4157
52/698

(Continued)

FOREIGN PATENT DOCUMENTS

CN 201291373 Y 8/2009
CN 201771687 U 3/2011
(Continued)

OTHER PUBLICATIONS

Office Action in related Chinese Patent Application No. 201811553534. 1, dated Mar. 2, 2020. 6 pages.
(Continued)

*Primary Examiner* — Matthew P Travers
(74) *Attorney, Agent, or Firm* — Schmeiser, Olsen & Watts LLP

(57) ABSTRACT

A method for anchoring a sling of a rope for supporting loads, in a wind turbine, the wind turbine includes at least two components connected via a bolt-and-nut arrangement includes multiple pairs of bolts and nuts at opposing flanges, the nuts fastening to the bolts at the upper flange, wherein at least one adapter includes a cylindrical outer holding surface for receiving the sling is placed atop of at least one nut covering its edges, and the sling is fastened to the adapter is provided.

8 Claims, 3 Drawing Sheets

(51) Int. Cl.
*F03D 13/40* (2016.01)
*B66C 1/12* (2006.01)
*F16B 37/14* (2006.01)
*B66C 1/10* (2006.01)

(52) U.S. Cl.
CPC ............... *B66C 1/108* (2013.01); *B66C 1/12* (2013.01); *F05B 2230/61* (2013.01); *F05B 2240/916* (2013.01); *F05B 2260/301* (2013.01); *F16B 37/14* (2013.01)

(58) Field of Classification Search
CPC ............ F05B 2260/301; F05B 2260/02; F05B 2230/50; F16B 37/14; F03D 13/10; F03D 13/20; F03D 13/40; F03D 80/50
See application file for complete search history.

(56) References Cited

U.S. PATENT DOCUMENTS

| | | | |
|---|---|---|---|
| 2010/0080667 A1 | 4/2010 | Reed | |
| 2011/0232071 A1* | 9/2011 | Knoop | F03D 80/00 29/525.02 |
| 2013/0104376 A1 | 5/2013 | Pedersen | |
| 2013/0115073 A1 | 5/2013 | Thiel et al. | |
| 2013/0340154 A1 | 12/2013 | Hand et al. | |
| 2015/0300323 A1* | 10/2015 | Neumann | F03D 80/00 415/168.1 |
| 2016/0067849 A1 | 3/2016 | Junkers et al. | |
| 2017/0274842 A1* | 9/2017 | Parenti | F16B 41/005 |

FOREIGN PATENT DOCUMENTS

| | | |
|---|---|---|
| CN | 102971530 A | 3/2013 |
| CN | 103026060 A | 4/2013 |
| CN | 103945748 A | 7/2014 |
| CN | 105033626 A | 11/2015 |
| CN | 105283272 A | 1/2016 |
| CN | 206268018 U | 6/2017 |
| KR | 20110015041 A | 2/2011 |
| WO | 9729289 A1 | 8/1997 |
| WO | WO 9729289 A1 | 8/1997 |

OTHER PUBLICATIONS

EP Search Report for application No. 17207938.6 dated Jun. 25, 2018.

* cited by examiner

METHOD FOR ANCHORING A HOLDING MEANS IN A WIND TURBINE AND ADAPTER

CROSS REFERENCE TO RELATED APPLICATIONS

This application claims priority to European application No. 17207938.6, having a filing date of Dec. 18, 2017, the entire contents of which are hereby incorporated by reference.

FIELD OF TECHNOLOGY

The following relates a method for anchoring a holding means of a transport tool, in particular a sling of a rope for supporting loads, in a wind turbine, the wind turbine comprising at least two components connected via a bolt-and-nut arrangement comprising multiple pairs of bolts and nuts at opposing flanges, the nuts fastening to the bolts at the upper flange. The embodiments of the invention further concerns an adapter for use in such a method.

BACKGROUND

Wind turbines as known in the state of the art are lofty structures usually comprising a tower carrying a nacelle, to which a hub and/or a canopy may be attached. In many cases, the tower, and sometimes also the nacelle, are comprised of multiple components which are attached together by nut-and-bolt arrangements. Additionally, functional units like the hub and/or the canopy and/or the nacelle can be attached to each other also by using such nut-and-bolt arrangements. Usually, a great number of nut-and-bolt pairs is used to firmly attach components together. Up to 100 or more pairs of nut and bolt can be used, in particular for connecting tower components using respective flanges.

In a wind turbine, sometimes heavy equipment is needed at elevated working positions, for example in the nacelle, and/or components of the wind turbine may have to be exchanged. To transport these heavy components and/or tools, it has been proposed to use flanges in the tower as anchorage points to be able to lift/move these heavy components and/or tools. To achieve this, heavy hydraulic torque tools are lifted from the ground to the tower platform to loosen some of the tower bolts and mount adapters for swivel eye bolts. This task is hard manual work for the technicians and very time consuming.

SUMMARY

An aspect relates to the present embodiments of the invention to simplify the manual work during anchoring holding means of a transport tool, reduce time consumed and the cost of the operation.

The method includes placing at least one adapter comprising a cylindrical outer holding surface for receiving the holding means atop of at least one nut, covering the edges of the nut, and fastening the holding means to the adapter.

In this manner, an anchorage point for a holding means, in particular the sling of a rope, can be created without loosening the tower bolts or bringing heavy hydraulic torque tools to the elevated position of the flanges. At least one adapter is mounted to each of at least one nut without loosening anything. The adapter covers these sharp edges of the nut and allows to wrap a sling around its outer holding surface and thus the nut, thereby creating an anchorage point (lifting point). The time consumed by mounting anchorage points and the manual work, in particular caused by bringing heavy hydraulic torque tools to elevated positions, is reduced significantly, consequently reducing the cost during lifting operations at the wind turbine, in particular inside the tower of the wind turbine. Preferably, the method is used at the flanges connecting two components of the tower of the wind turbine, in particular flanges located at or near a tower platform of the tower.

In an especially preferred embodiment, the adapter has an upper portion comprising an inner thread matching the outer thread of the bolt onto which the nut is fastened and the adapter is screwed onto a part of the bolt projecting over the nut such that a lower portion comprising at least a part of the outer holding surface houses the nut. That is, the adapter is preferably firmly mounted on top of the nut using the thread of the corresponding bolt projecting out of the nut. To achieve this, an inner thread of an upper portion of the adapter is provided, matching the thread of the bolt. Preferably, the lower portion has at least the height of the nut. Thus, the lower portion with its outer holding surface spans the whole nut such that the adapter is supported by a surface of the flange, which is also in contact with a surface of the nut. In use, the adapter may thus be screwed on top of the nut until its lower surface abuts on the corresponding flange of the component, using of the projecting part of the bolt and its thread. In this manner, simple and reliable fastening of the adapter is implemented such that the adapter covers the whole of the nut and therefore its sharp edges.

In an alternative embodiment, the adapter may have an inner profile shaped to interlock with the nut and is positioned onto the nut. Thus, the adapter is firmly held in place by matching its inner profile to the outer profile of the nut so that interlocking occurs.

Preferably, an adapter comprising at least an upper rim delimiting the outer holding surface is used. The upper rim functions as a stop collar for the holding means, in particular a sling, wrapped around the adapter on the outer holding surface. In this manner, the holding means can be securely fastened to the adapter.

The adapter may preferably be made of metal, in particular steel, to be robust, resilient and easy to handle.

While the embodiments of the invention are preferably performed at connected, opposing flanges of tower components of the wind turbine, the components may also comprise components of a nacelle and/or a hub and/or a canopy of the wind turbine, allowing usage of the embodiments of the invention in other parts of the wind turbine for installation and/or exchange of different further components, where a number of nut-and-bolt pairs are accessible for attachment of inventive adapters and one or more holding means, in particular slings.

The transport tool, in particular the rope, may preferably be used for holding a sliding tool and/or a further component of the wind turbine to be installed and/or exchanged and/or a heavy tool for use in an elevated position of the wind turbine. Thus, the method can be used in many different applications.

In a preferred embodiment, at least one mat of soft material may be placed on the flange around the nut-and-bolt pair on which the at least one adapter is to be placed. The soft material of the mat protects the holding means and/or the transport tool further from the hard surface and/or edges of the flanges themselves. For example a rubber mat may be used.

The embodiments of the invention also comprise an adapter for use in a method according to the embodiments of the invention, comprising a cylindrical outer holding surface for receiving the holding means and positionable on top of a nut. All comments in regard of the inventive method also apply to the inventive adapter, such that the same advantages are achieved.

BRIEF DESCRIPTION

Some of the embodiments will be described in detail, with reference to the following figures, wherein like designations denote like members, wherein.

Figure 5:
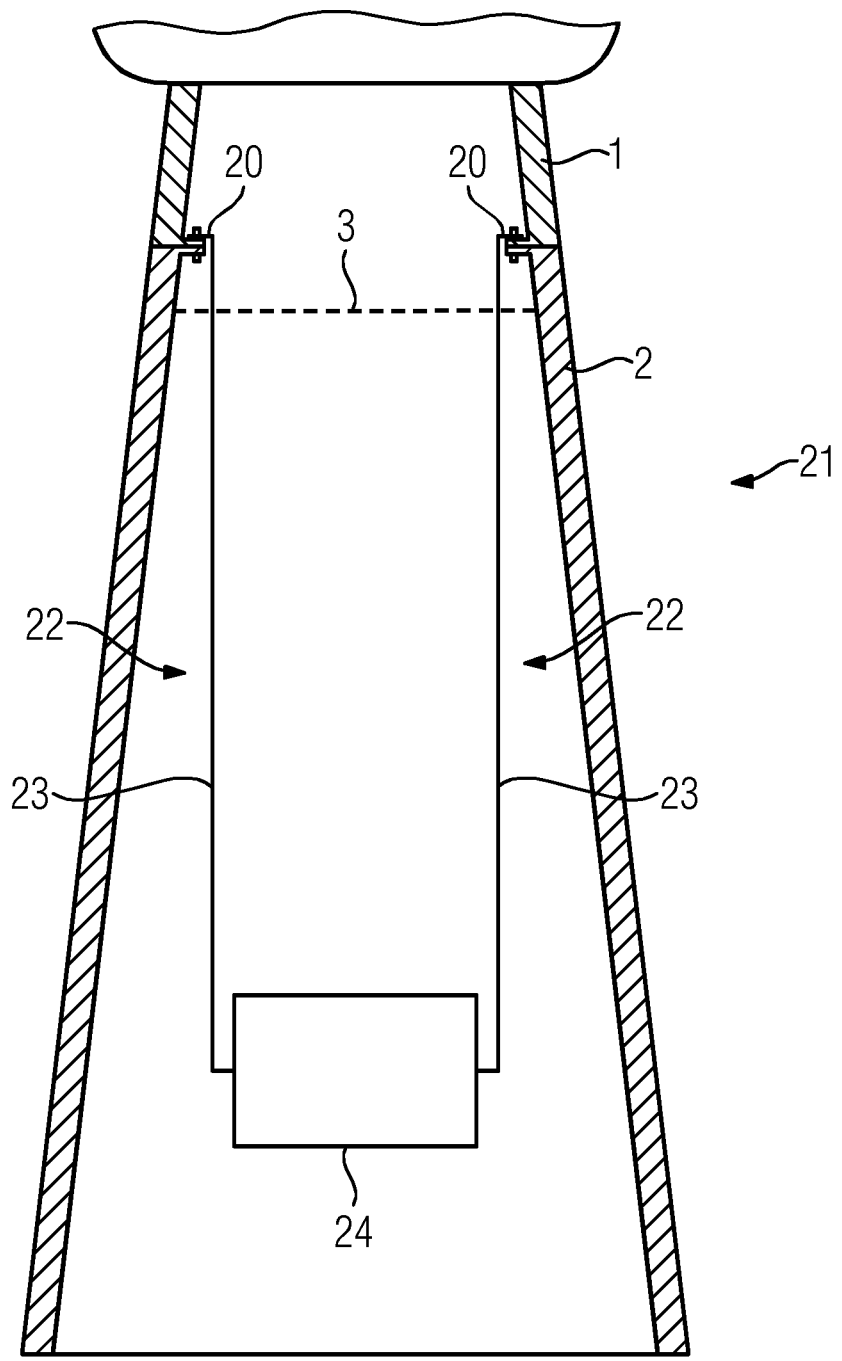

FIG. 5 schematically shows lifting of a further component in the wind turbine.

DETAILED DESCRIPTION

Figure 1:
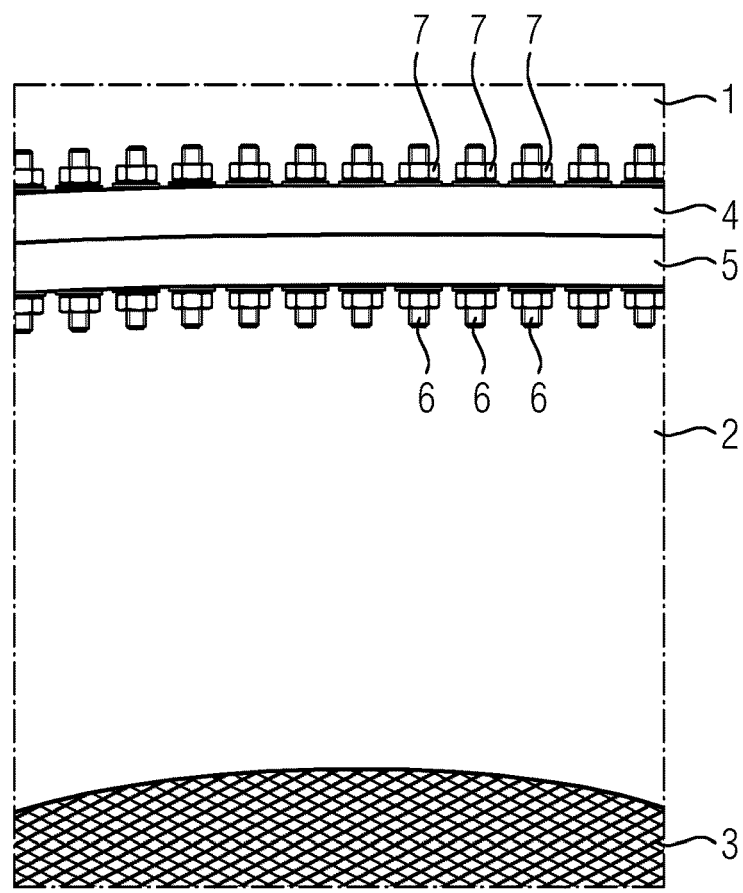
FIG. 1 shows two components of a tower of a wind turbine attached to each other.

FIG. 1 illustrates the attachment of two components 1, 2 of a tower of a wind turbine in the vicinity of an upper tower platform 3. Each of the components 1, 2 comprises a circular inner flange 4, 5 having drilled vertical holes extending therethrough. Bolts 6 extend through these holes and are fixed using corresponding nuts 7. While, in the state of the art, at least one of these pairs of nut 7 and bolt 6 had to be removed and replaced by an adapter comprising a swivel eye bolt to provide an anchorage point for a holding means, in particular a sling, of a transport tool, in particular a rope, the embodiments of the invention provide a simplified method for creating such an anchorage point.

Figure 2:
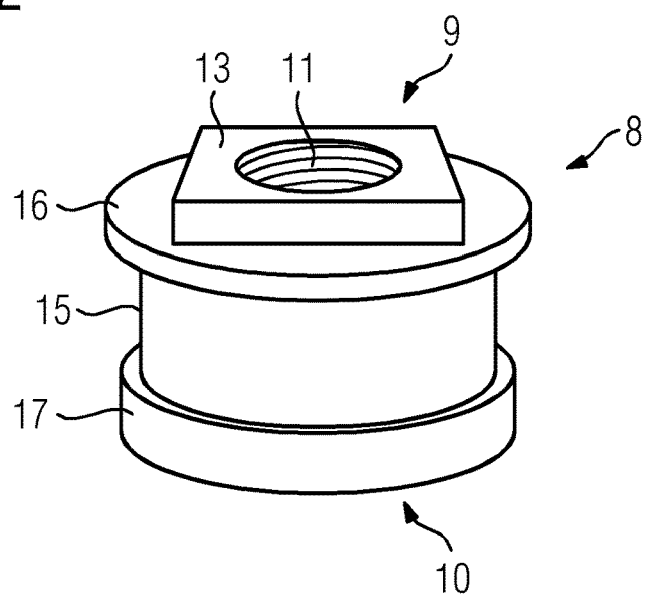
FIG. 2 is a perspective view of an inventive adapter.
Figure 3:
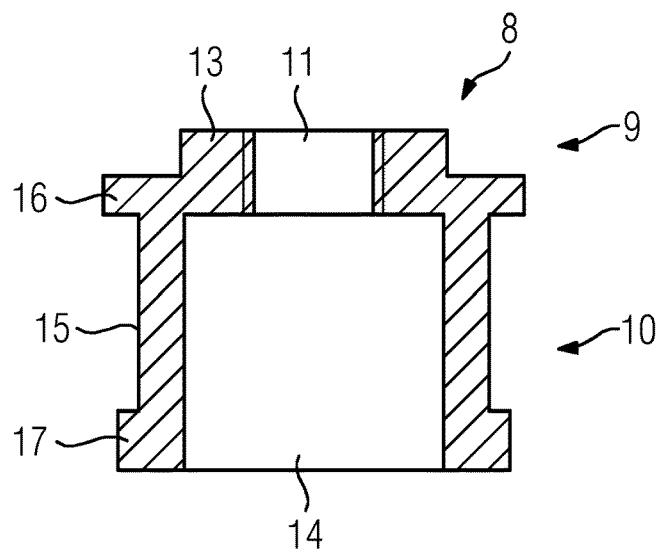
FIG. 3 is a cross-sectional view of an inventive adapter.

Instead of replacing a pair of nut 7 and bolt 6, an adapter 8 as shown in FIGS. 2 and 3 is provided. The adapter 8 is made of steel and comprises an upper portion 9 and a lower portion 10. The upper portion 9 comprises an inner thread 11 meshing with the outer thread 12 (see FIG. 4) of the bolt 6 projecting through the nut 7. An upper projecting part 13 of the adapter 8 has a quadratic shape so that tools, for example plyers or a wrench, can be used to screw the adapter 8 onto a projecting bolt 6 such that the adapter 8 covers the corresponding nut 7 below by virtue of an inner cavity 14 of the lower portion 10. The lower portion 10 is dimensioned to cover the whole nut 7 such that the height of the cavity 14 is at least the height a nut 7. In this manner, when the adapter 8 is screwed atop of a nut, the edged surface of the nut 7 is replaced by an outer cylindrical holding surface 15 of the adapter 8 which is delimited on its upper and lower boarder by rims 16, 17, preventing the slippage of a sling from the outer holding surface 15 and thus the adapter 8.

Figure 4:
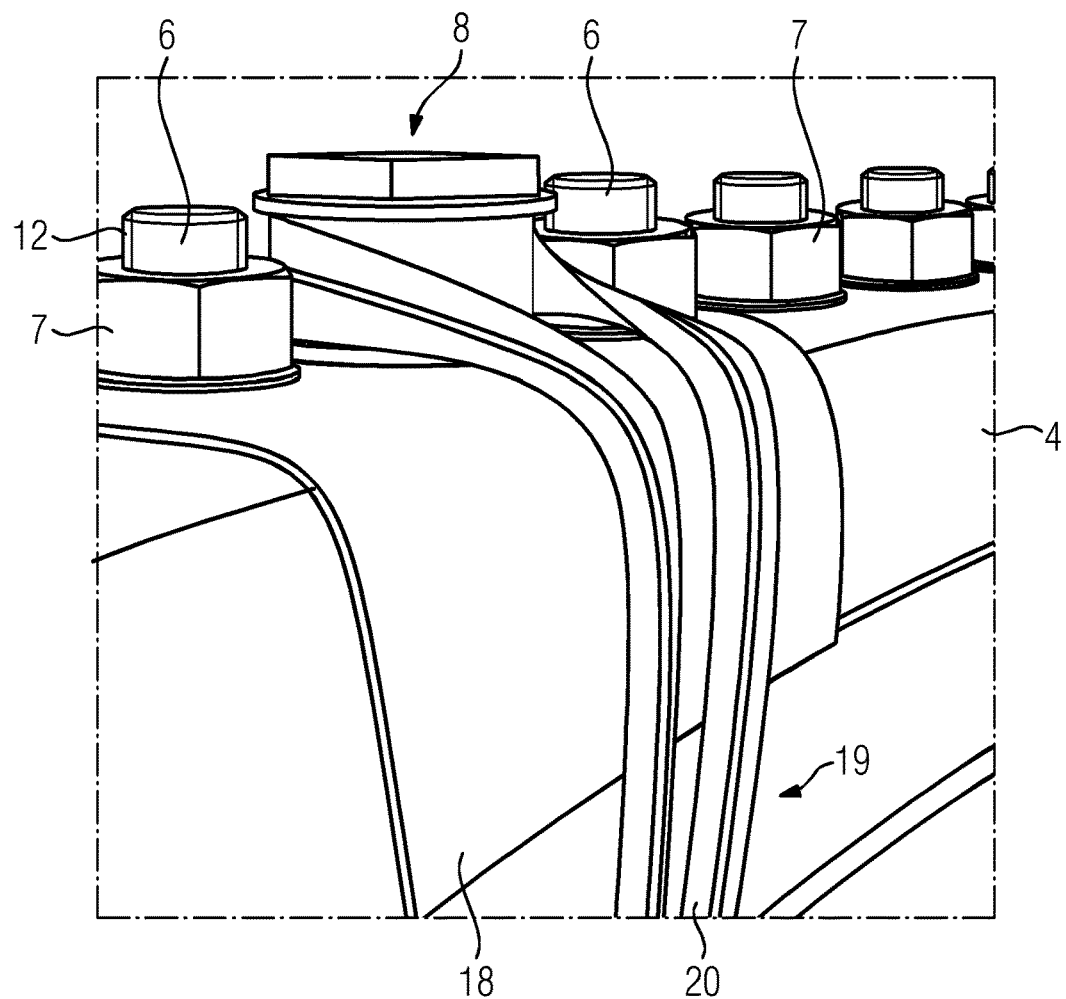
FIG. 4 illustrates the usage of the adapter of FIGS. 2 and 3.

FIG. 4 shows the adapter 8 in use. Before the adapter 8 has been screwed onto the projecting portion of a bolt 6, a mat 18 made of a soft material, for example rubber, has been placed on the flange 4 to further protect a holding means 19, in this embodiment a sling 20 of a rope, which has been wrapped around the adapter 8 subsequently screwed atop a corresponding nut 7, as shown in FIG. 4.

As can be seen, no sharp edges of the now covered nut 7 damage the sling 20 which is firmly held by virtue of the rim 16.

FIG. 5 is a principle drawing of the usage of the current embodiments of the invention in lifting loads inside a tower 21 of a wind turbine. At two horizontally opposing pairs of bolts 6 and nuts 7, an adapter 8 has been placed, respectively. The so-created anchorage points are used to attach transport means 22, in this case ropes 23 with corresponding slings 20. The ropes 23 can now be used to lift and/or guide a further component 24 of the wind turbine, for example a generator, which is to be installed or replaced, inside the tower 21. Multiple further applications are conceivable.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for anchoring a holding means of a transport tool for supporting loads, in a wind turbine, the wind turbine comprising at least two components connected via a bolt-and-nut arrangement comprising multiple pairs of bolts and nuts at opposing flanges, the nuts fastening to the bolts at an upper flange of the opposing flanges, the method comprising:

placing at least one adapter comprising a cylindrical outer holding surface defined between an upper rim and a lower rim for receiving the holding means atop of at least one nut of the nuts, covering edges of the at least one nut, wherein the holding means is fastened to the at least one adapter;

wherein the adapter further comprises an upper projecting part having a quadratic shape disposed on a top surface of the upper rim, the upper projecting part being structurally integral with the upper rim;

wherein the at least one adapter has an upper portion comprising an inner thread matching an outer thread of a bolt onto which the at least one nut is fastened and the at least one adapter is screwed onto a part of the bolt projecting over the at least one nut such that a lower portion of the at least one adapter comprising at least a part of the outer holding surface houses the at least one nut.

2. The method according to claim 1, wherein the lower portion has at least a height of the at least one nut.

3. The method according to claim 1, wherein the at least one adapter has an inner profile shaped to interlock with the at least one nut and is positioned onto the at least one nut.

4. The method according to claim 1, wherein at least one adapter is made of steel.

5. The method according to claim 1 wherein at least one mat is placed on the opposing flanges around a nut-and-bolt pair on which the at least one adapter is to be placed.

6. The method according to claim 1, wherein the at least two components comprise components of a tower and/or a nacelle and/or a hub and/or a canopy.

7. The method according to claim 1, wherein the transport tool is used for holding a sliding tool and/or a further component of the wind turbine to be installed or exchanged and/or a tool for use in an elevated position of the wind turbine.

8. The method according to claim 1, wherein the transport tool is a sling of a rope.

* * * * *